(12) United States Patent
Russhard

(10) Patent No.: US 8,457,909 B2
(45) Date of Patent: Jun. 4, 2013

(54) TIMING ANALYSIS

(75) Inventor: Peter Russhard, Nottingham (GB)

(73) Assignee: Rolls-Royce PLC, London (GB)

( * ) Notice: Subject to any disclaimer, the term of this patent is extended or adjusted under 35 U.S.C. 154(b) by 658 days.

(21) Appl. No.: 12/588,645

(22) Filed: Oct. 22, 2009

(65) Prior Publication Data

US 2010/0153031 A1   Jun. 17, 2010

(30) Foreign Application Priority Data

Dec. 16, 2008 (GB) .................................. 0822859.5

(51) Int. Cl.
    *G01L 7/00* (2006.01)
(52) U.S. Cl.
    USPC .............. 702/56; 702/33; 702/34; 702/36; 702/54; 702/57; 702/179; 702/187; 702/190; 702/193; 702/194; 702/195; 702/199; 73/660
(58) Field of Classification Search
    USPC ............ 702/56, 33, 34, 54, 57, 179, 187, 702/189, 190, 193, 194, 195, 199; 73/660
    See application file for complete search history.

(56) References Cited

U.S. PATENT DOCUMENTS

| | | | |
|---|---|---|---|
| 4,049,644 A | | 9/1977 | Wennerstrom |
| 4,790,189 A | * | 12/1988 | Twerdochlib .................. 73/660 |
| 4,955,269 A | | 9/1990 | Kendig et al. |
| 5,974,882 A | * | 11/1999 | Heath .............................. 73/579 |
| 2002/0162395 A1 | | 11/2002 | Chatellier et al. |
| 2008/0177485 A1 | | 7/2008 | Cohen et al. |

FOREIGN PATENT DOCUMENTS

| | | |
|---|---|---|
| GB | 2 416 848 A | 2/2006 |
| WO | WO 95/30134 | 11/1995 |
| WO | WO 2008/105981 A1 | 9/2008 |

OTHER PUBLICATIONS

Takashi et al., "Extraction of the inphase and quadrature components from oversampled bandpass signals using multistage decimator with BPFs and its performance evaluation," Digital Signal Processing Workshop, IEEE (1994).*

* cited by examiner

*Primary Examiner* — Jonathan C Teixeira Moffat
*Assistant Examiner* — Hyun Park
(74) *Attorney, Agent, or Firm* — Oliff & Berridge, PLC

(57) ABSTRACT

A method for analysing blade displacements detected by circumferentially-spaced stationary timing probes associated with a rotating blade assembly, the displacements corresponding to times at which the blades pass the probes. The method includes identifying resonant vibration events in the assembly by: for detected blade displacement detected by a probe, determining an associated running average blade displacement from a predetermined number of blade displacements detected by that probe for the same blade at adjacent rotations, and subtracting the associated running average blade displacement from the blade displacement to calculate a corresponding zeroed blade displacement; determining, for successive rotations, correlation factors that quantify the degree of correlation between the zeroed blade displacements for a particular blade on a particular rotation and modelled blade displacements corresponding to possible blade vibrational deflections on that rotation; and identifying a resonant vibration event on a rotation when one or more correlation factors cross a predetermined threshold.

13 Claims, 7 Drawing Sheets

Fig.2
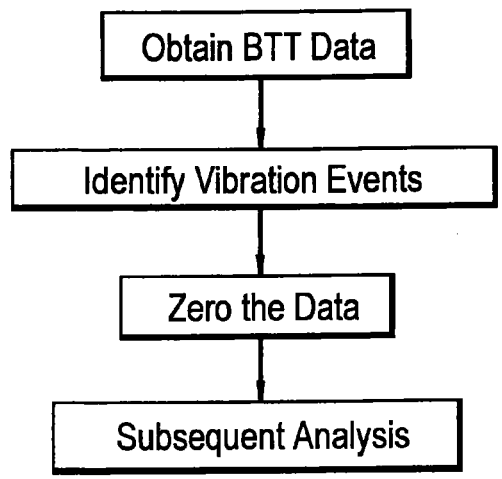
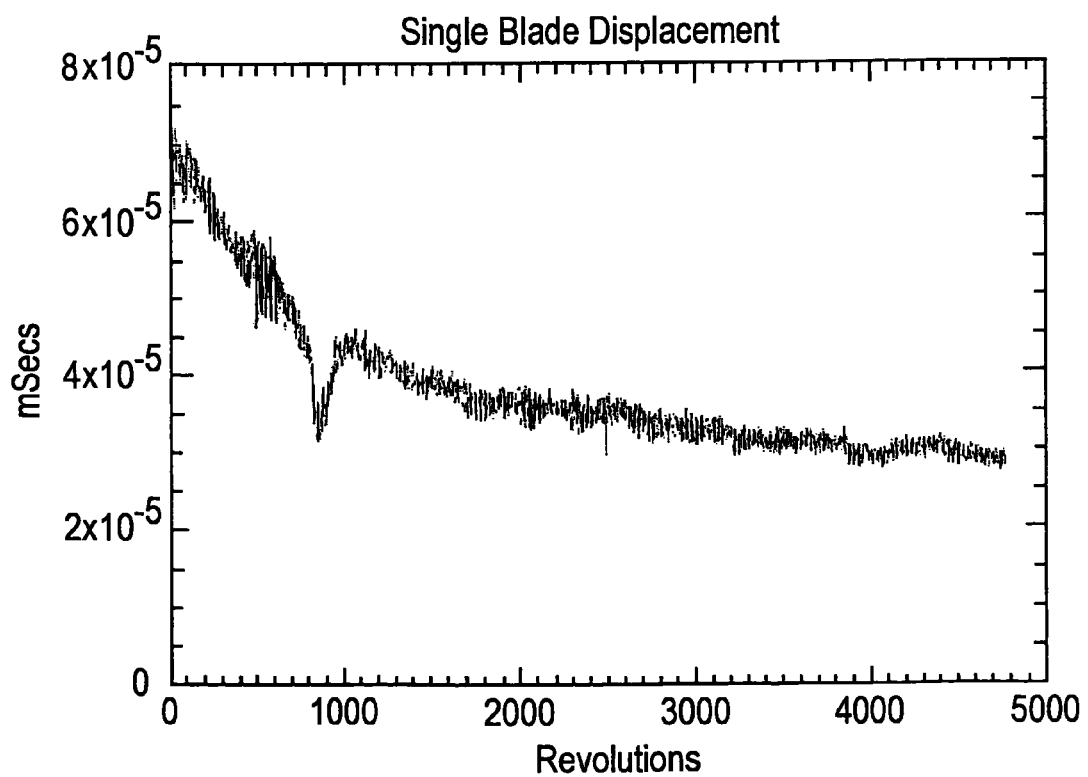
Fig.3

Fig.4
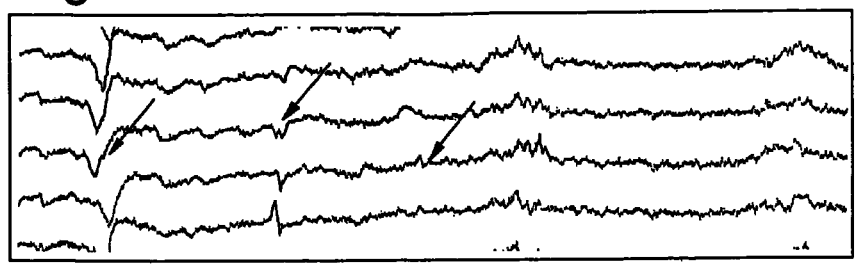
Fig.5
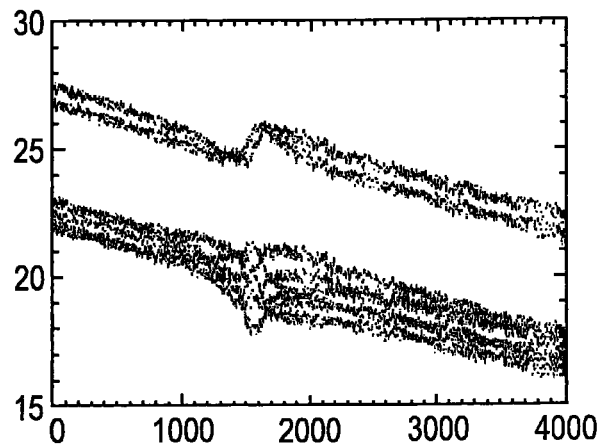
Fig.6
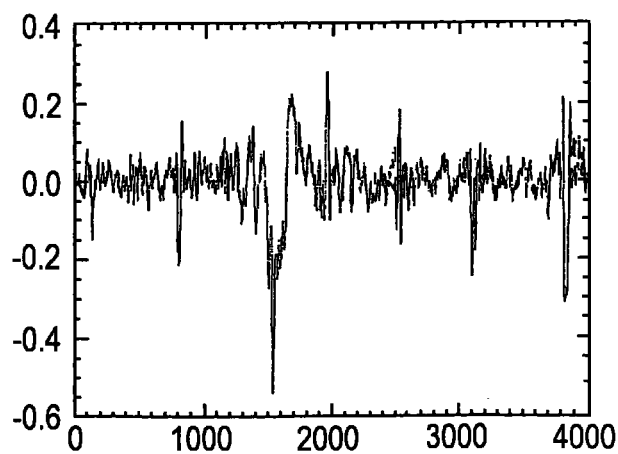

Displacement Data (d)

Time $$\sum_{d=0}^{d=M}(d_0 \cdot k_0 + ... d_M \cdot k_M)$$

Filtered Data

Filter Kernel (k) of Length M

Arriving timings for next rotation

Each Buffer, $B_1 ... B_n$, has length N

Average over each buffer recalculated every N rotations

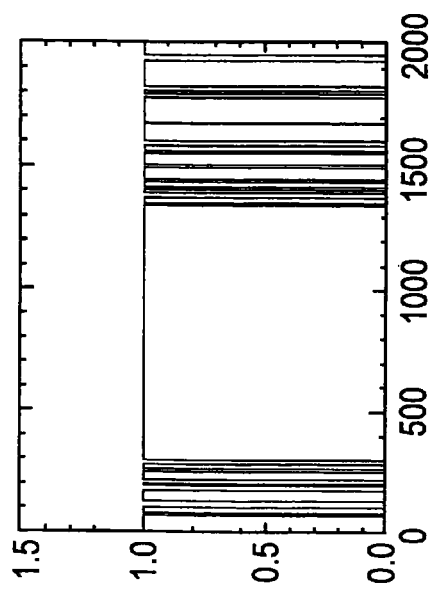
Fig.11 (a)
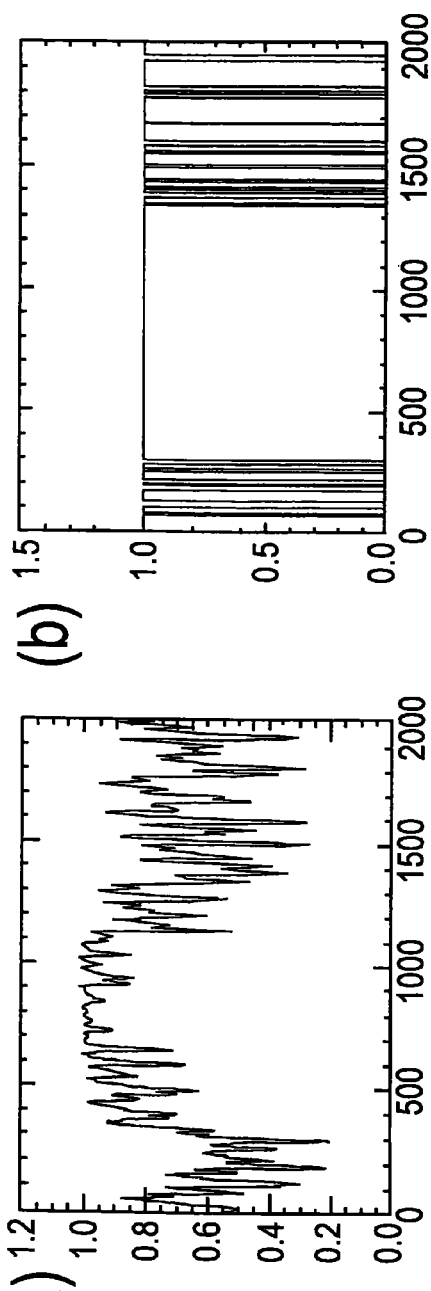
(b)
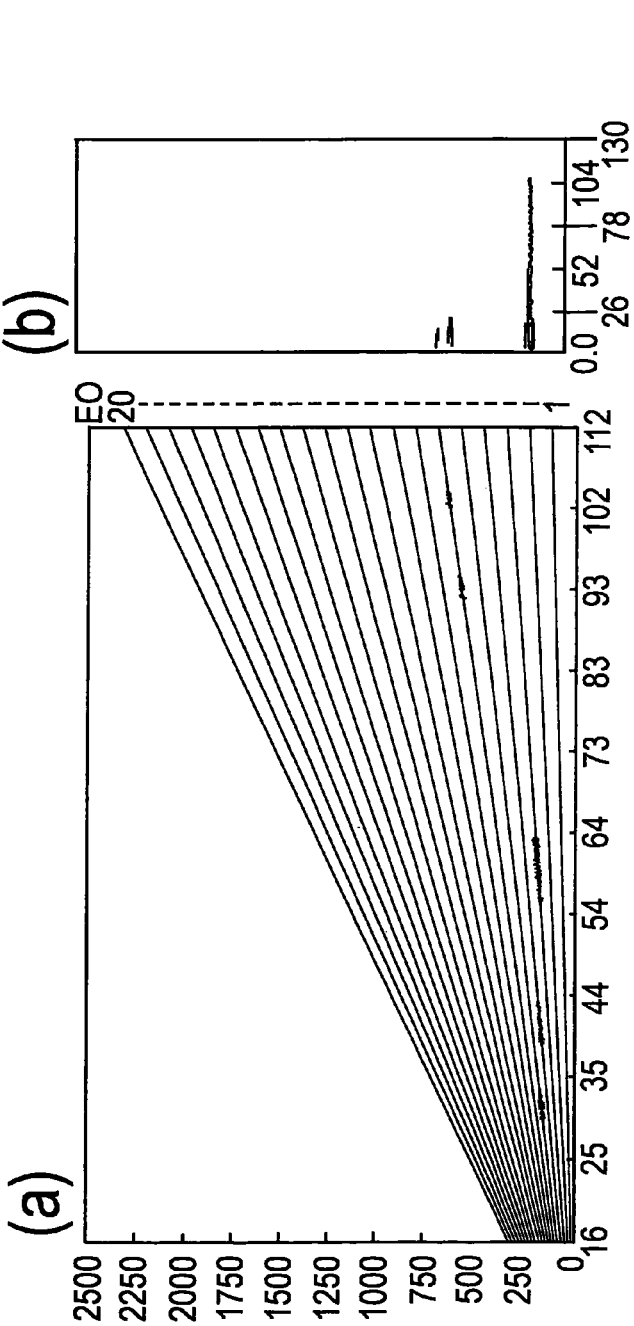
Fig.12

TIMING ANALYSIS

The present invention relates to the timing analysis of rotating blades, such as those found in gas turbine engines.

In the development of gas turbine engines, it is important to determine the amount of vibration of the rotating blades. From vibration measurements, stresses induced in the blades may be determined. Action can then be taken to avoid stresses which are high enough to cause damage to the blades.

As described for example in US patent application no. 2002/0162395, it is known to mount strain gauges on rotating compressor/turbine blades to provide information about the amplitudes and frequencies of vibration of the blades. One or more strain gauges can be provided on each blade, and connected to a radio telemetry system mounted on the rotor, which transmits the measurements from the rotor. However, due to the number of strain gauges required to fully determine the vibrations, the telemetry system is typically complex, expensive, large and time-consuming to install within the rotor.

An alternative technique for characterising blade rotation is "blade tip timing" (BTT) in which non-contact timing probes, typically mounted on the engine casing, are used to measure the time at which a blade passes each probe. This time is compared with the time at which the blade would have passed the probe if it had been undergoing no vibration. This is termed the "expected arrival time" and can be calculated from the rotational position of the particular blade on the rotor in conjunction with a "once per revolution" or "OPR" signal which provides information about the position of the rotor. The OPR signal is derived from the time at which an indicator on the rotor passes a reference sensor, and its use is well known in the art.

The difference between the expected arrival time and the actual arrival time can be multiplied by the blade tip velocity to give the displacement of the blade from its expected position. Thus BTT data from a particular probe effectively measures blade tip displacement at the probe.

Advantageously, the tip timing method does not require a telemetry system since the probes are mounted on the casing.

However, because the sampling rate of the probes is determined by the rotational frequency of the rotor, it is often below the Nyquist frequency for the vibrations of interest. Thus each probe undersamples the vibrations, leading to problems such as aliasing. A further problem with BTT data is that it is often intrinsically noisy due to probe movement caused by mounting restrictions and casing thickness.

Nonetheless, with a plurality of timing probes, it is possible, in principle, to perform useful vibration analysis that can be converted into blade stresses.

Blade vibration events that are tied to rotational speed (termed synchronous vibration) can be particularly damaging to a rotor blade. However, BTT analysis and monitoring of synchronous vibration has been problematic to perform in real time.

Synchronous vibrations manifest themselves as DC shifts in blade position due to the relatively low sampling rate and the vibration occurring at integer multiples of the OPR signal. For most forms of BTT analysis, it is important that these DC shifts are not adulterated by pre-processing of the BTT data. Conventionally, pre-processing is performed offline where it is possible to use data from before and after blade vibration events in order to separate wanted and unwanted DC portions of the blade displacements. The unwanted portions of the timing probe measurements, which are often similar in magnitude to the wanted portions of the measurements, are typically caused by small mechanical differences in the blade/probe combinations.

Controlling the pre-processing parameters manually during such resonances, which are often short lived, is highly dependent upon the skill of the operator performing the analysis. Indeed, different operators, confronted with the same data, may analyse it in different ways, to produce different results. Further, the offline nature of the pre-processing means that synchronous vibrations cannot conventionally be analysed and monitored in real time.

An object of the present invention is to provide a method for analysing BTT data which can allow blade displacement and frequency values to be calculated in real time, or near real time, thereby enhancing the safe running of bladed rotors. A further object is to provide a method for analysing BTT data which can be performed without manual intervention, thereby removing uncertainties associated with the involvement of operators and enhancing response times.

Thus a first aspect of the present invention provides a method of analysing blade displacements detected by a plurality of circumferentially spaced stationary timing probes associated with an assembly of rotating blades mounted on a rotor, the blade displacements corresponding to the times at which the blades pass the respective probes, the method including the step of:

(a) identifying resonant vibration events in the assembly of rotating blades by performing the substeps of:

(a-i) for each blade displacement detected by a timing probe, determining an associated running average blade displacement from a predetermined number of blade displacements detected by that probe for the same blade at adjacent rotations of the assembly, and subtracting the associated running average blade displacement from the blade displacement to calculate a corresponding zeroed blade displacement;

(a-ii) determining, for successive rotations of the assembly, one or more correlation factors for respectively one or more of the blades, each correlation factor quantifying the degree of correlation between the zeroed blade displacements for a particular blade on a particular rotation and modelled blade displacements corresponding to possible blade vibrational deflections on that rotation; and (a-iii) identifying a resonant vibration event with a rotation when one or more of the correlation factors cross a predetermined threshold.

Advantageously, the method can be performed without substantial latency. It is also automatable and repeatable. It therefore, facilitates real time identification of resonant vibration events.

Preferably, in substep (a-ii) the or each blade has a plurality of correlation factors, each correlation factor being associated with a respective engine order. This can improve the accuracy of the identifications.

Preferably, the running average blade displacement determined in substep (a-i) is an intermittently varying running average, the value of which is recalculated periodically after a predetermined number rotations of the assembly. By recalculating periodically, rather than continuously, substantial signal degradation can be avoided.

Conveniently, the predetermined number rotations of the assembly can be the same as the predetermined number of blade displacements detected by the probe from which the running average blade displacement is determined.

The method may further include the step, before step (a), of:

filtering the blade displacements detected by a given timing probe for a given blade by passing those blade displacements through a convolution kernel, the output of the kernel being a filtered blade displacement. For example, the convolution kernel can apply a Savitsky-Golay filter.

The initial filtering step can improve the signal to noise ratio of the displacement data.

Conveniently, the convolution kernel may have a length which is the same as the predetermined number of blade displacements detected by the probe from which the running average blade displacement is determined.

Preferably, each filtered blade displacement is fedback into the kernel to produce a filtered blade displacement for a following rotation. This can further improve signal to noise ratios.

The method may further include the step of:

(b) re-zeroing blade displacements on rotations identified with a resonant vibration event by performing the substeps of:

(b-i) for each timing probe, determining a blade displacement offset from the average displacement of a predetermined number of blade displacements detected by that probe for the same blade at adjacent rotations of the assembly, all of which rotations are previous to the resonant vibration event, and (b-ii) for each blade displacement on a rotation identified with the resonant vibration event, replacing the previously-calculated corresponding zeroed blade displacement with an improved zeroed blade displacement calculated by subtracting from the blade displacement the respective blade displacement offset. Typically, none of said rotations previous to the event are identified with a resonant vibration event.

In this way, adulteration of the data within an event can be avoided. In particular, the amplitude and the phase of the wanted signal can be preserved so that further analysis can be quantitative.

The method may include the step of:

(c) fitting modelled blade displacements corresponding to possible blade vibrational deflections to the improved zeroed blade displacements to characterise the identified resonant vibration event.

Preferably the modelled blade displacements correspond to possible blade vibrational deflections at one or more engine order frequencies.

The method may further include an initial step of obtaining the blade displacements by detecting the times at which the blades pass the respective probes.

Typically, the identified resonant vibration events are synchronous resonant vibration events.

Typically, the probes measure the deflections of the tips of the blades.

Typically, the frequencies of the vibration events are undersampled by the probes.

Another aspect of the present invention provides the use of the method of the first aspect for monitoring rotor blades, e.g. on a rotor of a gas turbine engine. For example, such monitoring can be used to detect variations from normal behaviour, which variations may be associated with faults or dangerous operating conditions.

Further aspects of the present invention provide (i) a computer-based system for performing the method of the first aspect, (ii) a computer program for performing the method of the first aspect, and (iii) a computer program product carrying a program for performing the method of the first aspect.

Embodiments of the invention will now be described by way of example with reference to the accompanying drawings in which:

FIG. 2 is a flow chart showing procedural steps in the processing of timing data obtained by the probes of FIG. 1;

FIG. 3 shows typical displacement data from a timing probe for one blade;

FIG. 4 shows further typical displacement data for different blades at the same probe;

FIG. 5 shows displacement data for the same blade from six circumferentially spaced probes;

FIG. 6 shows the displacement data for just one of the probes of FIG. 5 after subtracting an average displacement from each displacement;

FIG. 11($a$) shows values for the modulus of a correlation coefficient calculated from the non-gated zeroed displacements of the upper trace of FIG. 10, and FIG. 11($b$) shows values for an on/off gating signal derived by applying a threshold of 0.5 to the correlation coefficient of FIG. 11($a$) and used to produce the improved zeroed displacements of the lower trace of FIG. 10;

Figure 13:
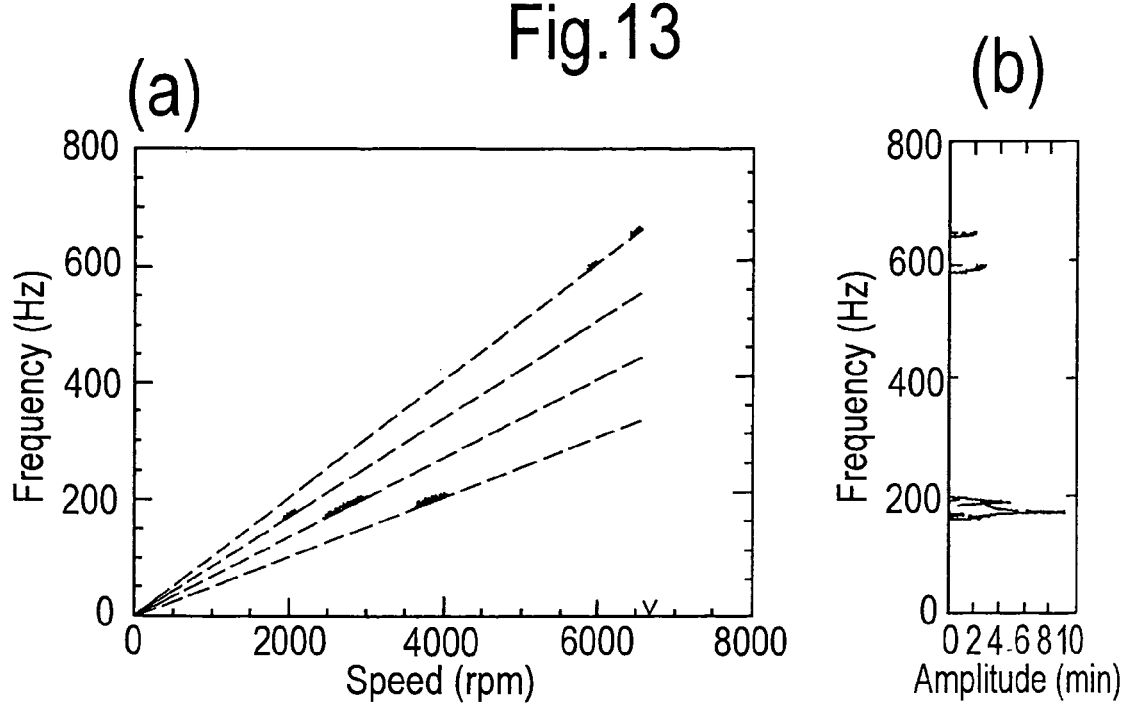
Figure 14:
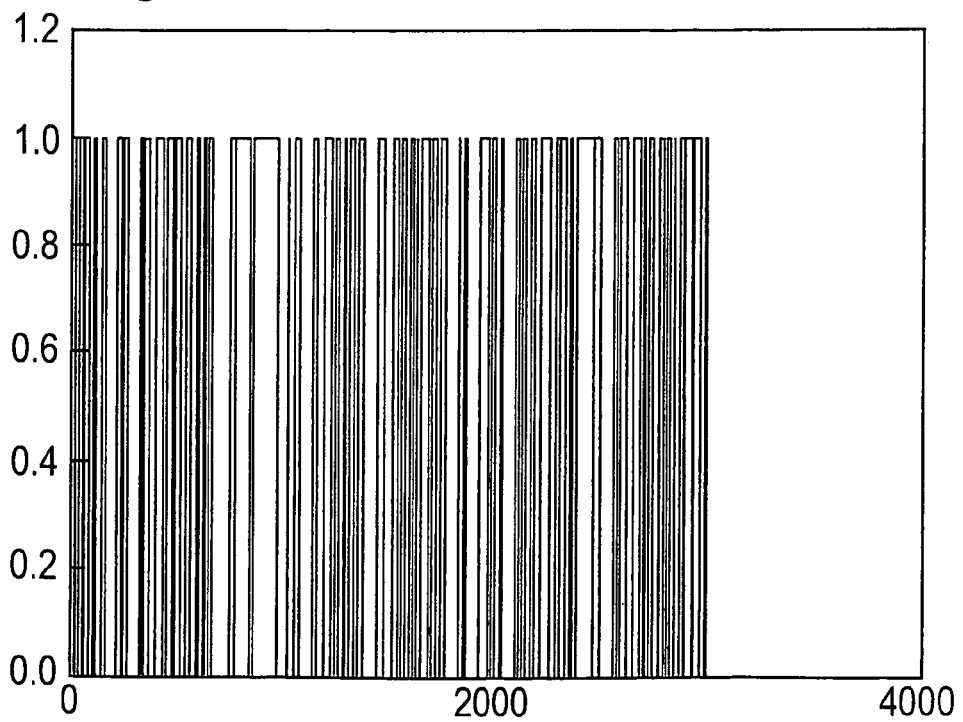

FIG. 12($a$) shows a plot of frequency against speed (known as a Campbell diagram) derived from timing data obtained from a blade on the fan of an accelerating gas turbine aeroengine, the timing data being processed offline in a conventional manner and transformed into the frequency domain, and FIG. 12($b$) shows the maximum peak to peak amplitudes of the resonant vibration events visible in FIG. 12($a$);

FIG. 13($a$) shows another Campbell diagram derived from the timing data of FIG. 12, in this case the timing data being processed in real time using the method of the present invention and transformed into the frequency domain, and FIG. 13($b$) shows the maximum peak to peak amplitudes of the resonant vibration events visible in FIG. 13($a$); and FIG. 14 shows values for an on/off gating signal used to identify resonant frequency vibration events for a test in which an engine rotor is running at fairly constant speed, but other changes to the engine operating conditions are continuously causing resonances to stop and start.

Figure 1:
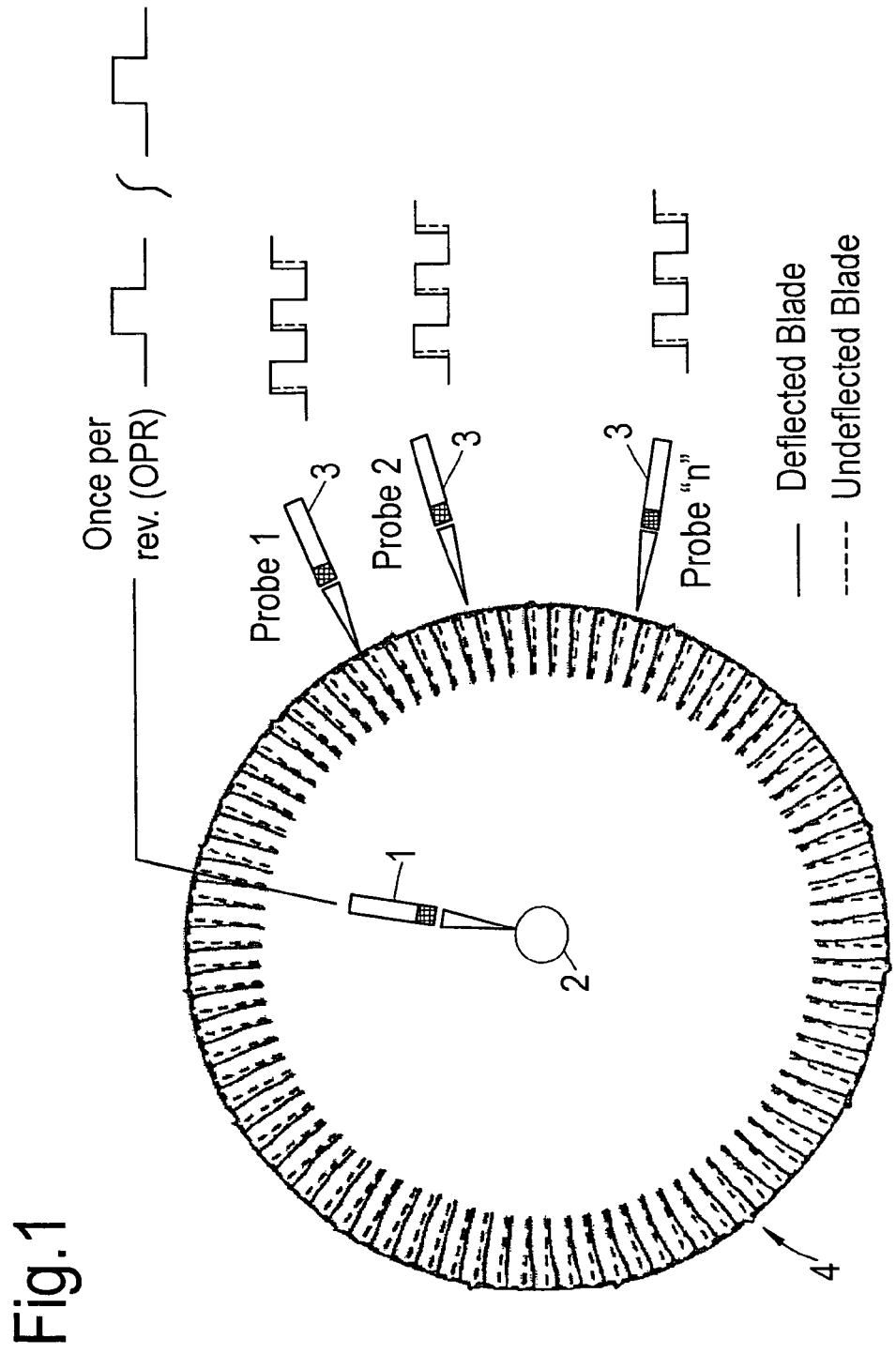
FIG. 1 shows schematically a BTT arrangement.

FIG. 1 shows schematically a BTT arrangement. An OPR probe 1 monitors the position of rotor 2, while 1 to n BTT probes 3 provide timings for blades 4 mounted to the rotor.

FIG. 2 is a flow chart showing procedural steps in the processing of the timing data obtained by the probes. Firstly, the data is analysed to identify resonant vibration events. Having identified these events, the data is zeroed. The data is then ready for further analysis, such as characterisation (e.g. quantifying phases and amplitudes) of the vibration events in a manner known to the skilled person. Below, we discuss in more detail the steps of identifying the resonant vibration events and zeroing the data.

FIG. 3 shows typical displacement data from a timing probe for one blade. The data have been pre-processed to reject spikes, but otherwise contain the same amount of noise as the initial data. The rotor speed increased during the course of the data acquisition, and the large DC downwards trend in the data is caused by the consequent aerodynamic loading of the blade.

The data are relatively noisy, but applying simple amplitude thresholding, at least one possible vibration event can be identified at about 800 revolutions.

However, amplitude thresholding can be a misleading approach to identifying vibration events. Firstly, amplitude thresholding can produce false positives due to the noise in the signal. Secondly, amplitude thresholding can overlook particularly vibration events caused by synchronous blade responses. In a synchronous response, the blade vibrates at a frequency which is an exact multiple of the sampling frequency for the blade at the BTT probes (i.e. an exact multiple of the OPR frequency). Typically, such a response produces only a DC shift in the timing data, and that shift can be relatively small. In contrast, asynchronous responses, for which there is no correlation between the frequency of the vibrational response of a blade and the BTT probe sampling frequency, are generally easier to identify by simple amplitude thresholding, although signal noise may still cause difficulties, and the DC shift in the blade position requires that the threshold level changes throughout a manoeuvre.

FIG. 4 shows further typical displacement data for different blades at the same probe. Vibration events are marked with arrows. The duration of each event may be very small and each blade may respond differently and at a different time, making visual identification of events extremely subjective.

A possible approach for identifying synchronous resonant vibration events is based on fitting modelled blade displacements corresponding to possible blade vibrational deflections to the actual timing data, and identifying an event when there is significant correlation between the model and the data.

For example, the model can take the form of the following expression:

$$\text{modelled displacement} = a_0 + a_1 \sin(eo\omega t) + a_2 \cos(eo\omega t) \quad (1)$$

where $a_0$, $a_1$ and $a_2$ are unknown constants, eo is the frequency of the predicted engine order, $\omega$ is angular velocity, and t is time. Similar models can be applied for other engine orders by replacing eo with the frequencies of those additional predicted orders. Such expressions model the blade vibrational deflection as the result of sinusoidal motion of the blade. The model is not limited to a single sinusoidal term (i.e. pair of sin and cos terms) and may be composed of multiple engine order responses by including further sinusoidal terms, each representing a particular order.

Timing data from the circumferentially spaced probes from a given rotation of the rotor allows values for $a_0$, $a_1$ and $a_2$ to be found for that rotation. In principle, the degree of correlation between expression (1) and the actual displacements then allows identification of a synchronous resonant vibration event on that rotation. However, a problem arises in that solving expression (1) requires the timing data from all the probes to have the same DC offset.

FIG. 5 shows displacement data for the same blade from six circumferentially spaced probes. The different DC offsets in the data from the probes are evident. A synchronous resonant vibration event is indicated by the arrow.

It might be thought that a solution to the problem of the DC offsets is to zero the data by simply subtracting a running average displacement from each displacement. However, a result of performing such a procedure on just one of the sets of displacement data of FIG. 5 is shown in FIG. 6. The synchronous resonant vibration event (arrowed), although still discernible, is now a less significant feature of the data. Importantly, the zeroed data is no longer suitable for subsequent filtering and analysis. More specifically, the subtraction of a running average has reduced the amplitude and shifted the phase of the wanted signal and so any further analysis is no longer quantitative. Further, the amount of signal degradation is dependent upon acceleration, speed, resonance amplitude and damping and cannot be quantified to allow a corrected value to be obtained. However the event is still useful as an indicator of a specific resonance, as explained below.

Thus the present invention takes a different approach to identification of resonant vibration events.

Figure 7:
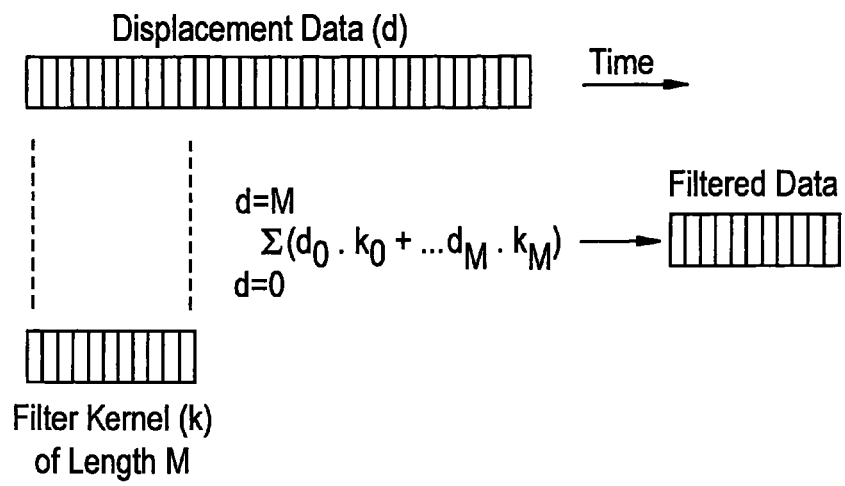
FIG. 7 is a schematic diagram of a convolution kernel for initial filtering of timing data.

Firstly, the timing data for a given blade and a given probe can be passed through a convolution kernel which has been optimised for BTT data. This filtering step improves the signal to noise ratio, reducing uncertainty in the results that can be obtained from the analysis. The length of the kernel determines the number of samples before the first output appears from its output, and hence its latency. FIG. 7 is a schematic diagram of the kernel. Savitsky-Golay filters can provide suitable kernels. The filter length (M in FIG. 7) can be, for example, the same length as the buffers $B_1, B_2 \ldots B_n$ used for data averaging and discussed below in respect of FIG. 8, e.g. 32. The Savitsky-Golay polynomial may be of fourth order.

The filtering can be improved if the mid-value of the kernel is replaced before each calculation of the filter output by the output from the previous calculation. That is, in the kernel, the values to the left of the mid-value (i.e. later values) are "raw" displacement data, while the mid-value itself and values to the right of the mid-value (i.e. earlier values) are previous outputs from the filter. As each new displacement measurement enters the filter kernel (from the left), the values already in the kernel shift one place to the right, with the rightmost value leaving the kernel. This procedure introduces an element of feedback into the filter and tends to improve the signal to noise ratio in the displacement data.

Figure 8:
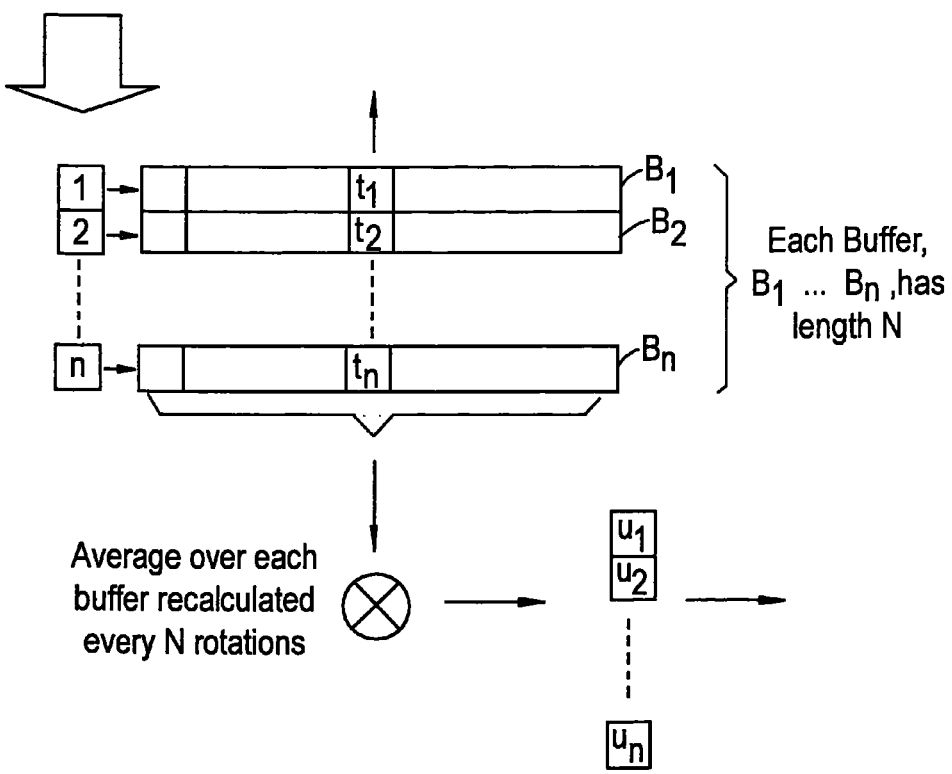
FIG. 8 shows schematically an implementation of an average displacement calculation.

Next, a running average blade displacement is calculated for each probe. The running average is based on a predetermined number of blade displacements detected by that probe for the same blade on adjacent rotations of the rotor. FIG. 8 shows schematically how the running average calculation can be implemented. Timing data for probes 1 to n arrives at each rotation for a particular blade, and is placed at the end of a respective buffer $B_1, B_2 \ldots B_n$, each of length N. For example, when N=32, each buffer contains data from 32 rotations which then equates to the analysis latency. For a typical analysis this latency is less than 0.25 seconds. The average values of displacements in the respective buffers are stored at positions $u_1, u_2 \ldots u_n$.

The averages are only recalculated each time the buffers are entirely filled with new displacement values (so, for example, every 32 rotations). Therefore, the averages are intermittently varying running averages, rather than continuously varying running averages. Calculating more frequently (e.g. at every rotation to produce continuously varying running averages) can lead to substantial signal degradation during subsequent use of the averages whereby resonances cannot be identified in the timing data.

The currently calculated value for the average displacements stored at positions $u_1, u_2 \ldots u_n$ are associated with corresponding actual displacements, $t_1, t_2 \ldots t_n$. In FIG. 7, $t_1$, $t_2 \ldots t_n$ are illustrated at the centres of the buffers $B_1, B_2 \ldots B_n$. However, because the average displacements are only recalculated each time the buffers are completely refilled, the position of the corresponding actual displacements in the buffers moves progressively from the first to the last location in the buffers over each N rotations.

Figure 9:
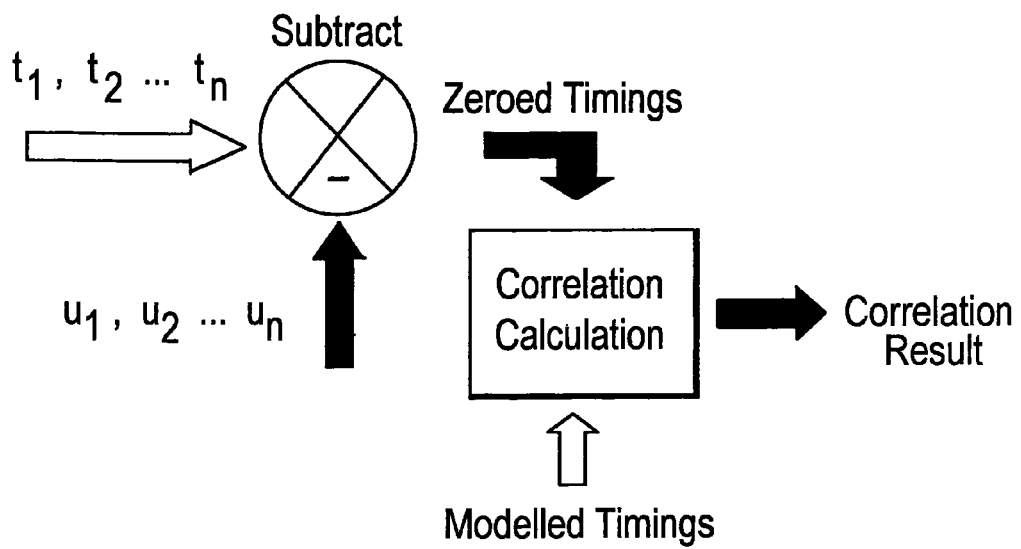
FIG. 9 shows schematically a procedure for zeroing displacements and determining from a correlation calculation if the displacements include a resonant vibration event.

Next, as shown schematically in FIG. 9, the average displacements are subtracted from their corresponding actual displacements. This produces zeroed data which are usually unsuitable for subsequent filtering and analysis. However, the zeroed data are generally adequate for the identification of resonant vibration events using e.g. the approach outlined above in relation to expression (1).

As mentioned above, expression (1) can be solved using displacements from three circumferentially spaced probes. The three simultaneous equations can be expressed in matrix form as:

$$\begin{bmatrix} 1.0 & \sin(eo\omega t + \varphi 1) & \cos(eo\omega t + \varphi 1) \\ 1.0 & \sin(eo\omega t + \varphi 2) & \cos(eo\omega t + \varphi 2) \\ 1.0 & \sin(eo\omega t + \varphi 3) & \cos(eo\omega t + \varphi 3) \end{bmatrix} \begin{bmatrix} a0 \\ a1 \\ a2 \end{bmatrix} = \begin{bmatrix} d1 \\ d2 \\ d3 \end{bmatrix} \quad (2)$$

Where $\phi_1$, $\phi_2$ and $\phi_3$ are the respective phases (i.e. known circumferential positions) of the three probes, and d1, d2, and d3 are the respective zeroed displacements at the three probes. Because there are three unknowns ($a_0$, $a_1$ and $a_2$) and three variables (d1, d2, d3), solution of the simultaneous equations of expression (2) gives a least squares solution for the modelled and the zeroed displacements.

Generally, however, displacements are available from more than three probes. In this case, reduced singular value decomposition can be used to derive the values for $a_0$, $a_1$ and $a_2$, providing a better least squares solution to the zeroed displacements. For example, with eight circumferentially spaced probes, the corresponding matrix expression would be:

$$\begin{bmatrix} 0 & \sin(eo\omega t + \varphi 1) & \cos(eo\omega t + \varphi 1) & 0 & 0 & 0 & 0 & 0 \\ 0 & \sin(eo\omega t + \varphi 2) & \cos(eo\omega t + \varphi 2) & 0 & 0 & 0 & 0 & 0 \\ 0 & \sin(eo\omega t + \varphi 3) & \cos(eo\omega t + \varphi 3) & 0 & 0 & 0 & 0 & 0 \\ 0 & \sin(eo\omega t + \varphi 4) & \cos(eo\omega t + \varphi 4) & 0 & 0 & 0 & 0 & 0 \\ 0 & \sin(eo\omega t + \varphi 5) & \cos(eo\omega t + \varphi 5) & 0 & 0 & 0 & 0 & 0 \\ 0 & \sin(eo\omega t + \varphi 6) & \cos(eo\omega t + \varphi 6) & 0 & 0 & 0 & 0 & 0 \\ 0 & \sin(eo\omega t + \varphi 7) & \cos(eo\omega t + \varphi 7) & 0 & 0 & 0 & 0 & 0 \\ 0 & \sin(eo\omega t + \varphi 8) & \cos(eo\omega t + \varphi 8) & 0 & 0 & 0 & 0 & 0 \end{bmatrix} \begin{bmatrix} a0 \\ a1 \\ a2 \\ a3 \\ a4 \\ a5 \\ a6 \\ a7 \end{bmatrix} = \begin{bmatrix} d1 \\ d2 \\ d3 \\ d4 \\ d5 \\ d6 \\ d7 \\ d8 \end{bmatrix} \quad (3)$$

where $d_1 \ldots d_8$ are the eight zeroed displacements for the respective probes.

Having thus obtained values for $a_1$ and $a_2$ for each engine order of interest for a blade on a specific rotation, the corresponding amplitude and phase can be determined from:

$$\text{Amplitude} = (a_1^2 + a_2^2)^{1/2} \quad (4)$$

$$\text{Phase} = A\tan(a_2/a_1) \quad (5)$$

The value for $a_0$ gives the residual value of the DC component after solving the least squares fit and can be used for analysis of blade lean and axial movement, and for quality checks.

The correlations between the modelled amplitude and phase, and the zeroed displacements can then be quantified, for example, by calculating the Pearson product moment correlation coefficient for the modelled displacements and the zeroed displacements. More specifically, the correlation coefficient, R, is given by:

$$R = \left( \frac{1}{n-1} \sum \left( \frac{D_i - \overline{D}}{s_D} \right) \left( \frac{d_i - \overline{d}}{s_d} \right) \right)^2 \quad (6)$$

where n is the number of probes, $D_i$ and $d_i$ are respectively the calculated and actual zeroed displacements of the selected blade at the $i^{th}$ probe for present rotation, $\overline{D}$ and $\overline{d}$ are the corresponding average calculated displacement and average actual zeroed displacement of the selected blade at the probes for the present rotation, and $s_D$ and $s_d$ are the corresponding standard deviations of the blade displacements for respectively the calculated and actual zeroed displacements. R takes a value between −1 and +1.

Thus, if there are eight circumferentially spaced probes, at each rotation there is a set of eight values of actual zeroed displacement and a set of eight values of calculated displacement. The average and standard deviation of each of these sets are used to calculate R from expression (6).

More specifically, if the amplitude is calculated to be 3.7 mm and the phase to be 90° and the probe angular positions are as indicated in the second column below, the calculated displacements for a first engine order response would be as shown in the third column below:

| Probe number | Angular position (°) | Calculated displacement |
|---|---|---|
| 1 | 272 | 0.154 |
| 2 | 221 | −2.753 |
| 3 | 200 | −3.472 |
| 4 | 193.7 | −3.594 |
| 5 | 185 | −3.685 |
| 6 | 170.5 | −3.649 |
| 7 | 116.9 | −1.674 |
| 8 | 99.5 | −0.610 |

These calculated displacement values can be used in the correlation function of expression (6), along with the corresponding zeroed actual timings, to derive a value for R.

Taking the modulus of this value, and applying a threshold of 0.5 (which has been found experimentally to generally provide a reliable identification of resonant vibration events), a gating signal is derived indicative of the presence of blade resonant activity at the specified engine order.

Having identified an event, the displacements are then re-zeroed to avoid the problems discussed above in relation to FIG. 6. In particular, for each probe, improved zeroed displacements are calculated for displacements inside identified resonant vibration events.

The re-zeroing proceeds by subtracting from each displacement inside an event a blade displacement offset. This offset is the average displacement of a predetermined number of blade displacements detected by the respective probe for the same blade at adjacent rotations of the assembly, all of which rotations are previous to the resonant vibration event. Conveniently, the value of a particular offset can be the value of an average displacement for that probe/blade combination previously stored at the respective one of positions $u_1, u_2 \ldots u_n$ before it was replaced by the present average displacement. This can be achieved by saving the average displacements at positions $u_1, u_2 \ldots u_n$ into a further buffer for use as the offsets whenever buffers $B_1, B_2 \ldots B_n$ are refilled (i.e. after every N rotations), with the proviso that the saving procedure is interrupted whenever a resonant vibration event is identified on one or more of the N rotations. In this way, the offsets held in the further buffer always correspond to the last set of running average displacements for which none of the blade displacements used to calculate the average displacements is on a rotation identified with a resonant vibration event.

For blade displacements outside the event, no such re-zeroing is necessary.

Figure 10:
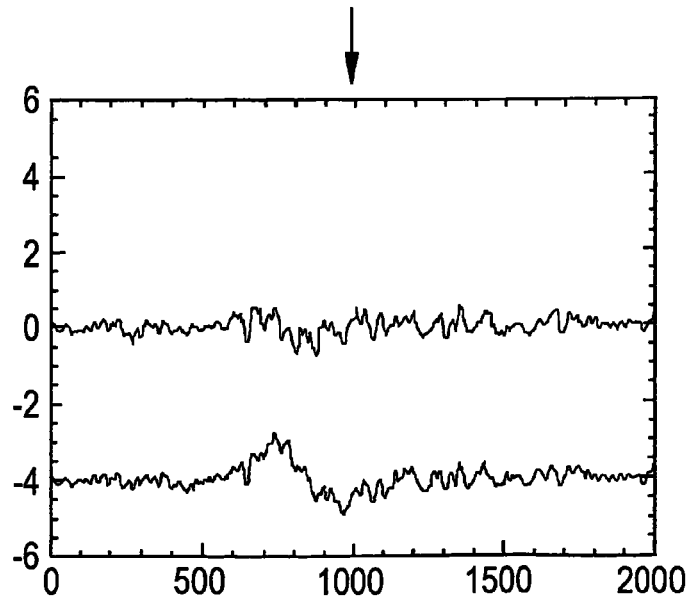
FIG. 10 shows in an upper trace the effect of zeroing displacements for a single probe using running average displacements but no gating, and in a lower trace the effect of zeroing the displacements for the probe using gating to provide improved zeroing inside resonant vibration events.

Effectively, the zeroing procedure is gated, with running average displacements being used to zero displacements outside identified events, and the last running average displacements prior to resonance being used to zero timings inside identified events. FIG. 10 shows in an upper trace the effect of zeroing displacements for a single probe using running average displacements but no gating, and by contrast in a lower trace (which is offset from the upper trace purely for convenience of presentation) the effect of zeroing the displacements for the probe using gating to provide improved zeroing inside resonant vibration events. The arrowed event is attenuated in the upper trace, but is more visible in the lower trace. Nonetheless, despite its attenuation in the upper trace, the event is still sufficiently significant in that trace to allow it to be identified using the procedure described above, and hence to produce the switch for the gating which enables the lower trace to be generated.

FIG. 11(a) shows values for the modulus of the correlation coefficient calculated from the non-gated zeroed displacements of the upper trace of FIG. 10. FIG. 11(b) then shows values for the on/off gating signal derived by applying a threshold of 0.5 to the correlation coefficient of FIG. 11(a) and used to produce the improved zeroed displacements of the lower trace of FIG. 10. Note the value of the threshold can be varied to increase or decrease the sensitivity of resonance identification.

Advantageously, the approach discussed above for identifying resonant vibration events and improved zeroing of the timing data is fast. In particular, it can be performed with a latency which may only be as long as half the length of the buffers $B_1, B_2 \ldots B_n$. Thus the improved zeroed displacements can be made available effectively in real time.

The approach is also automatable and repeatable.

Subsequently, the zeroed displacements may be appropriately filtered and individual blade amplitudes and frequency extracted. Techniques for such filtering and extraction are known to the skilled person.

For example, FIG. 12(a) shows a plot of frequency against speed (known as a Campbell diagram) derived from timing data obtained from a blade on the fan of an accelerating gas turbine aeroengine. The timing data were analysed initially offline in a conventional manner to identify resonant vibration events and zero the data. The zeroed data were fitted to modelled blade vibrational displacements using the approach described above in relation to expression (3), and the results were then transformed into the frequency domain. The plot shows engine tracked orders as straight lines. Five synchronous resonant vibration events (mode crossings), identified offline in the timing data in a conventional manner, appear as short-lived events overlaid on the third, fourth, fifth and sixth tracked orders. In the original plot, the events are colour-coded, with different colours identifying different vibrational phases. FIG. 12(b) shows the maximum amplitudes (peak to peak) of the events relative to the respective tracked order positions.

FIG. 13(a) shows another Campbell diagram derived from the same timing data as that of FIG. 12(a). In this case, however, the timing data were analysed in real time to identify resonant vibration events and zero the data using the method of the present invention. Again the zeroed data were fitted to modelled blade vibrational displacements using the approach described above in relation to expression (3), and the results were transformed into the frequency domain.

Only the third, fourth, fifth and sixth tracked orders are shown in FIG. 13(a), which otherwise corresponds to FIG. 12(a). Again, the same five synchronous resonant vibration events appear as short-lived events overlaid on the third, fourth, fifth and sixth tracked orders. FIG. 13(b) corresponds to FIG. 12(b).

The following table provides a quantitative comparison of the resonant vibration events shown in FIGS. 12 and 13 respectively. Each of the mode/engine order crossings represents a different frequency vibration event. The amplitudes are the maximum peak to peak values (i.e. the distance between the highest maximum and the lowest minimum peak) of the vibrations.

| Mode/engine order crossing | Offline (FIG. 11) amplitude (mm pk-pk) | Real time (FIG. 12) amplitude (mm pk-pk) |
| --- | --- | --- |
| M1/5EO | 2.28 | 2.57 |
| M1/4EO | 10.73 | 10.68 |
| M1/3EO | 5.15 | 4.61 |
| M2/6EO | 2.18 | 2.82 |
| M3/6EO | 1.43 | 1.75 |

Comparing FIGS. 12 and 13 and the table above it is evident that the use of the method of the present invention for online processing of the timing data has not significantly degraded the information derivable from the data. In particular, the amplitude values, which are generally of most concern to engine operators, are similar for offline and real time analysis. Thus, the method has the potential to make BTT a useful technique for monitoring of rotor blades in real time, which is highly desirable in both development and production environments.

FIG. 14 shows values for an on/off gating signal generated using the method of the present invention and used to identify resonant frequency vibration events for a test in which an engine rotor is running at fairly constant speed, but other changes to the engine operating conditions are continuously causing resonances to stop and start. Such stop-start resonances can be a common occurrence during testing, and are difficult to monitor using conventional BTT. However, the method of the present invention is generally robust and sensitive enough to correctly identify the individual resonances.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of analysing blade displacements detected by a plurality of circumferentially spaced stationary timing probes associated with an assembly of rotating blades mounted on a rotor, the blade displacements corresponding to times at which the blades pass the respective probes, the method comprising the step of:
  (a) identifying resonant vibration events in the assembly of rotating blades by performing the substeps of:
    (a-i) for each blade displacement detected by a timing probe, determining an associated running average blade displacement from a predetermined number of blade displacements detected by that probe for the same blade at adjacent rotations of the assembly, and subtracting the associated running average blade displacement from the blade displacement to calculate a corresponding zeroed blade displacement;
    (a-ii) determining, for successive rotations of the assembly, one or more correlation factors for respectively one or more of the blades, each correlation factor quantifying a degree of correlation between the zeroed blade displacement for a particular blade on a particular rotation and a modeled blade displacement corresponding to possible blade vibrational deflections on that rotation; and (a-iii) identifying, with a computer, a resonant vibration event within a rotation when one or more of the correlation factors cross a predetermined threshold; and (b) re-zeroing blade displacements on rotations identified with a resonant vibration event by performing the sub-steps of:

(b-i) for each timing probe, determining a blade displacement offset from the average displacement of the predetermined number of blade displacements detected by that probe for the same blade at adjacent rotations of the assembly, all of which rotations are prior to the resonant vibration event, and (b-ii) for each blade displacement on a rotation identified with the resonant vibration event, replacing the previously-calculated corresponding zeroed blade displacement with an improved zeroed blade displacement calculated by subtracting from the blade displacement the respective blade displacement offset.

2. The method of claim 1, wherein in substep (a-ii), each blade has a plurality of correlation factors, each correlation factor being associated with a respective engine order.

3. The method of claim 1, wherein the associated running average blade displacement determined in substep (a-i) is an intermittently varying running average, a value of which is recalculated periodically after a predetermined number rotations of the assembly.

4. The method of claim 1, further comprising the step, before step (a), of:

filtering the blade displacement detected by a given timing probe for a given blade by passing that blade displacement through a convolution kernel, an output of the kernel being a filtered blade displacement.

5. The method of claim 4, wherein each filtered blade displacement is fed back into the kernel to produce a filtered blade displacement for a following rotation.

6. The method of claim 1, wherein in step (b) none of the rotations prior to the resonant vibration event are identified with a resonant vibration event.

7. The method of claim 1, further comprising the step of:

(c) fitting the modeled blade displacement corresponding to possible blade vibrational deflections to the improved zeroed blade displacement to characterise the identified resonant vibration event.

8. The method of claim 7, wherein the modeled blade displacement corresponds to possible blade vibrational deflections at one or more engine order frequencies.

9. The method of claim 1, further comprising an initial step of obtaining the blade displacements by detecting the times at which the blades pass the respective probes.

10. A computer-based system for performing the method of claim 1.

11. A non-transitory computer program product carrying instructions that when executed perform the method of claim 1.

12. The method of claim 1, wherein the rotating blades are mounted on the rotor of a gas turbine engine.

13. The method of claim 1, wherein substeps (a-i) includes determining an associated running average blade displacement for each probe from a predetermined number of blade displacements detected by that probe for the same blade at adjacent rotations of the assembly.

* * * * *